(12) United States Patent
Zomok et al.

(10) Patent No.: US 11,010,744 B2
(45) Date of Patent: May 18, 2021

(54) SYSTEM FOR TAX TRACKING OF BLENDED GOODS AND RELATED METHODS

(71) Applicant: INMAR Rx SOLUTIONS, INC., Ft. Worth, TX (US)

(72) Inventors: Robert Zomok, Advance, NC (US); Kenneth Bays, Lewisville, NC (US); Brian Rogers, Greensboro, NC (US)

(73) Assignee: INMAR RX SOLUTIONS, INC., Ft. Worth, TX (US)

( * ) Notice: Subject to any disclaimer, the term of this patent is extended or adjusted under 35 U.S.C. 154(b) by 22 days.

(21) Appl. No.: 16/392,033

(22) Filed: Apr. 23, 2019

(65) Prior Publication Data
US 2020/0342434 A1    Oct. 29, 2020

(51) Int. Cl.
*G06Q 20/20* (2012.01)
*G06Q 20/40* (2012.01)

(52) U.S. Cl.
CPC ......... *G06Q 20/207* (2013.01); *G06Q 20/208* (2013.01); *G06Q 20/407* (2013.01)

(58) Field of Classification Search
CPC ........ G06Q 40/00; G06Q 10/00; G06Q 30/06; G06Q 30/00; G06Q 10/08; G06F 17/30; G06F 19/00
USPC ................................ 705/31, 37, 34, 26.1, 28
See application file for complete search history.

(56) References Cited

U.S. PATENT DOCUMENTS

| | | | |
|---|---|---|---|
| 2003/0105704 A1* | 6/2003 | Sundel | G06Q 10/0833 705/37 |
| 2003/0216981 A1* | 11/2003 | Tillman | G06Q 20/04 705/34 |
| 2004/0186760 A1* | 9/2004 | Metzger | G07F 7/0886 705/28 |
| 2006/0085308 A1* | 4/2006 | Metzger | G06Q 10/087 705/34 |
| 2015/0032584 A1* | 1/2015 | Wilson | G06Q 40/123 705/31 |
| 2018/0158125 A1* | 6/2018 | Perelman | G06Q 30/0639 |
| 2019/0340703 A1* | 11/2019 | West | G06Q 40/123 |

* cited by examiner

*Primary Examiner* — Olusegun Goyea
(74) *Attorney, Agent, or Firm* — Allen, Dyer, Doppelt + Gilchrist, P.A.

(57) ABSTRACT

A system for tax tracking of blended goods may include a value tracking server configured to, at a time of sale of an item including materials blended together, collect relative material quantities in the item, each of the materials having different respective tax rates associated therewith, and generate an identification (ID) for association with the item. The value tracking server may also be configured to, at a time of return, read the ID from the item to determine the relative material quantities in the item, determine a returned portion of the item, and determine a tax refund due based upon the relative material quantities, the respective tax rates, and the returned portion of the item.

15 Claims, 3 Drawing Sheets

SYSTEM FOR TAX TRACKING OF BLENDED GOODS AND RELATED METHODS

TECHNICAL FIELD

The present invention relates to the field of blended goods, and more particularly, to tracking tax of blended goods and related methods.

BACKGROUND

A particular good may have a respective tax rate associated therewith. In other words, upon the purchase of the good, a tax may be due, for example, to a taxing authority. The tax due may be calculated based upon an amount of the good being purchased.

Sometimes, a good may be blended, for example, upon purchase with one or more other goods, for example, that may have a different tax rate. Accordingly, a tax due, for example, to a taxing authority, may be calculated based upon the materials or goods blended to make up a particular item.

SUMMARY

A system for tax tracking of blended goods may include a value tracking server configured to, at a time of sale of an item including a plurality of materials blended together, collect relative material quantities in the item. Each of the materials may have different respective tax rates associated therewith. The value tracking server may also be configured to generate an identification (ID) for association with the item. The value tracking server may further be configured to, at a time of return, read the ID from the item to determine the relative material quantities in the item, determine a returned portion of the item, and determine a tax refund due based upon the relative material quantities, the respective tax rates, and the returned portion of the item.

The system may include a point of sale location for blending the plurality of materials together in the item, and attaching a label bearing the ID to the item. The system may include a return location for reading the ID from the item and communicating the ID to the value tracking server, for example. The return location may be configured to facilitate destruction of the returned portion of the item, for example.

The value tracking server may be configured to process tax payments. The value tracking server may be configured to process the tax refund, for example.

The plurality of materials may include a plurality of types of cannabis, for example. The system may include a cannabis dispensary, and the plurality of types of cannabis may be blended at the cannabis dispensary.

The value tracking server may be configured to determine the returned portion of the item based upon at least one of a returned weight and returned volume of the item. The relative material quantities in the item may include at least one of relative weights and relative volumes, for example.

A method aspect is directed to a method of tax tracking of blended goods. The method may include using a value tracking server to, at a time of sale of an item including a plurality of materials blended together, collect relative material quantities in the item, wherein each of the materials have different respective tax rates associated therewith, and generate an identification (ID) for association with the item. The method may also include, at a time of return, using the value tracking server to read the ID from the item to determine the relative material quantities in the item, determine a returned portion of the item, and determine a tax refund due based upon the relative material quantities, the respective tax rates, and the returned portion of the item.

A computer readable medium aspect is directed to a non-transitory computer readable medium tax for tracking of blended goods. The non-transitory computer readable medium includes computer executable instructions that when executed by a processor cause the processor to perform operations. The operations may include, at a time of sale of an item comprising a plurality of materials blended together, collecting relative material quantities in the item, wherein each of the materials having different respective tax rates associated therewith, and generating an identification (ID) for association with the item. The operations may also include, at a time of return, reading the ID from the item to determine the relative material quantities in the item, determining a returned portion of the item, and determining a tax refund due based upon the relative material quantities, the respective tax rates, and the returned portion of the item.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
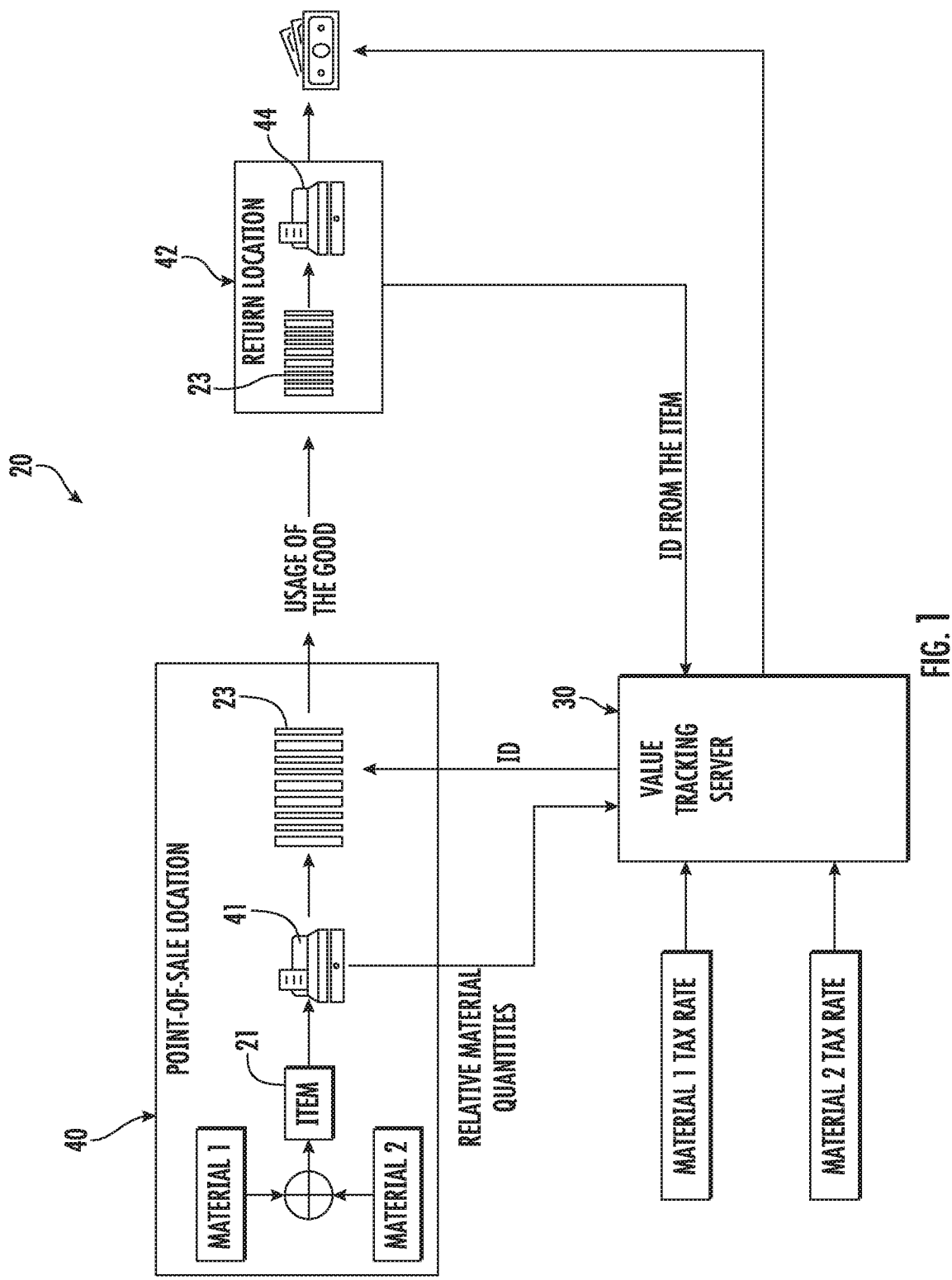
FIG. 1 is a schematic diagram of a system for tracking blended goods in accordance with an embodiment.
Figure 2:
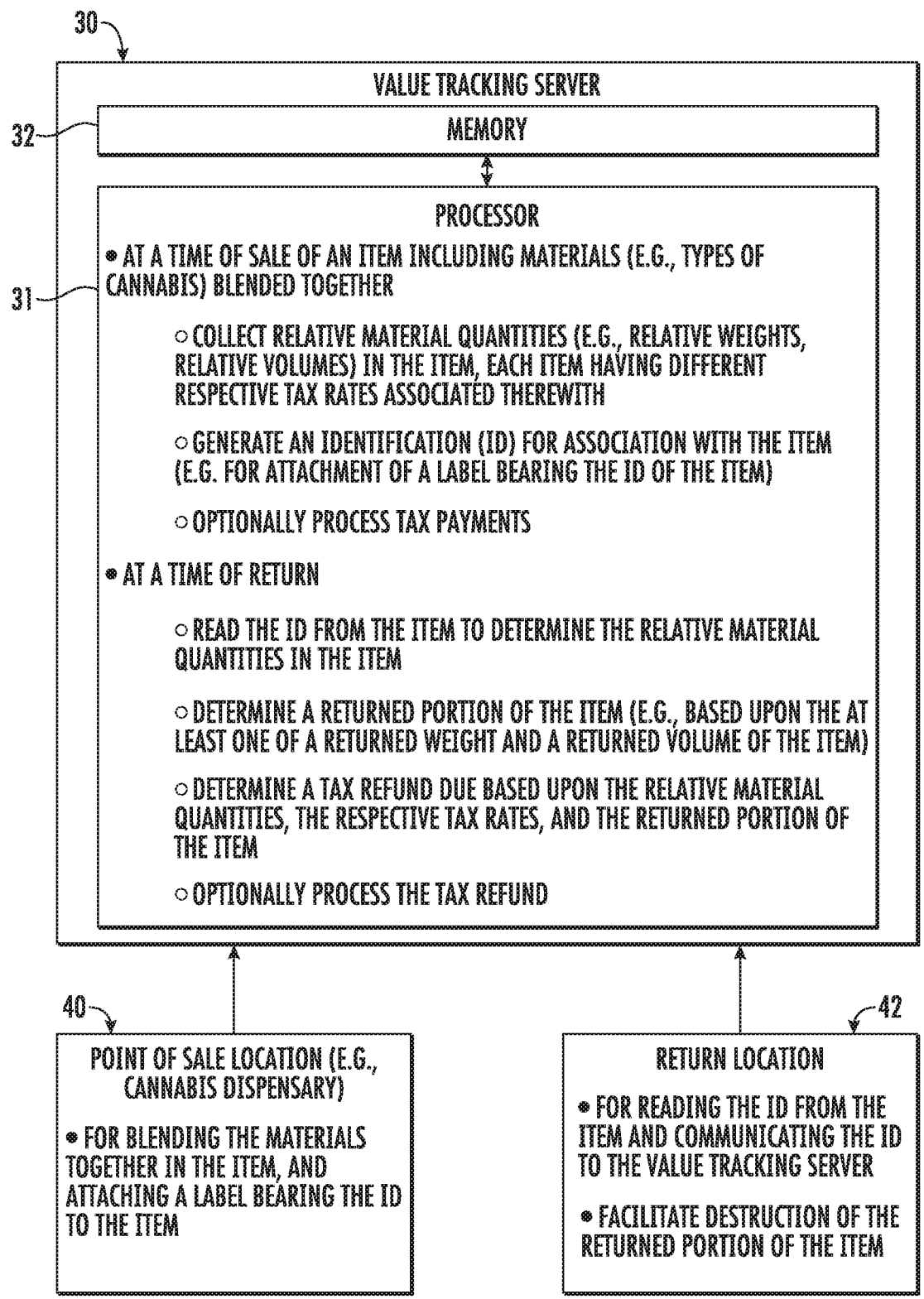
FIG. 2 is a schematic block diagram of the system for tracking blended goods of FIG. 1.

Referring initially to FIGS. 1-2, a system for tax tracking of blended goods 20 includes a value tracking server 30. The value tracking server 30 includes a processor 31 and a memory 32 cooperating therewith. While operations of the value tracking server 30 are described herein, it will be appreciated that the operations are performed through cooperation of the processor 31 and the memory 32.

Figure 3:
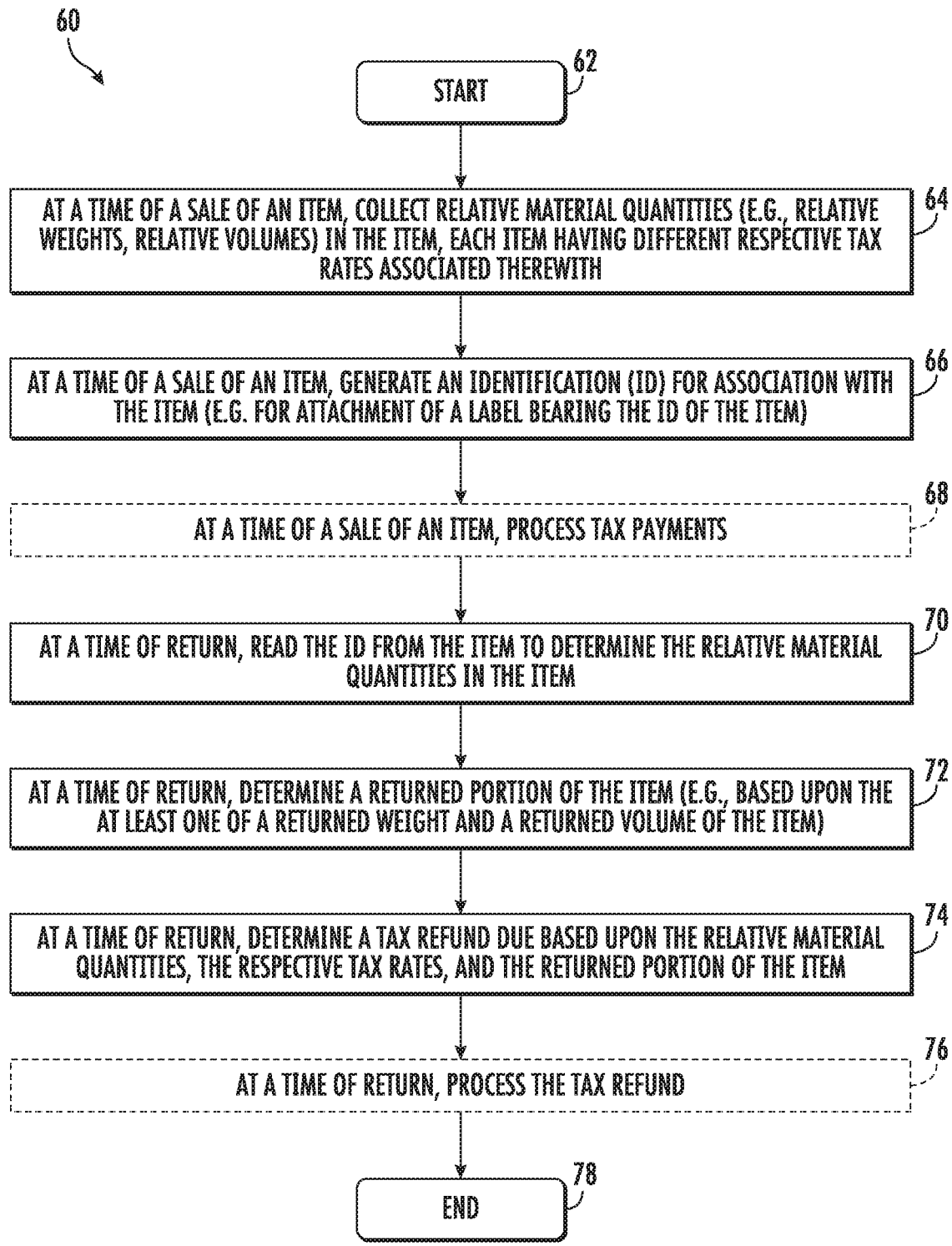
FIG. 3 is a flow diagram illustrating operation of the value tracking server of FIG. 2.

Referring now additionally to the flowchart 60 in FIG. 3, beginning at Block 62, operations of the value tracking server 30 will now be described. At Block 64, the value tracking server 30, at a time of sale of an item 21 that includes materials blended together, collects relative material quantities in the item (e.g., 40% material "A", 60% material "B"). For example, the item 21 may be a cannabis based item including different types of cannabis blended together. More particularly, the materials may be blended at a point-of-sale (POS) location 40, for example, a cannabis dispensary that is remote from the value tracking server 30. Of course, the materials may be other types of blended materials, for example, coffee and/or alcohol.

Each of the materials has different respective tax rates associated therewith. The tax rates may be determined based upon the type of material. For example, where the materials being blended are different types of cannabis, the amount of THC or active ingredient in the cannabis blend may determine the corresponding tax rate. Accordingly, the tax may be considered an excise tax. The respective tax rates may be provided to the value tracking server 30, for example, from a governing jurisdiction and/or retrieved by the value tracking server 30.

The relative material quantities in the item 21, which may include relative weights or relative volumes (e.g., percent weights or percent volumes), may be collected from a POS terminal 41 at the POS location 40. More particularly, during a checkout process or during the time of sale, the POS terminal 41 may communicate the blended materials and relative material quantities, and overall quantity or weight of the item 21 being purchased to the value tracking server 30. The relative material quantities may be stored or collected in the memory 32 and associated with an identification 23, as will be described in further detail below. Of course, the value tracking server 30 may collect the relative material quantities in the item 21 using other collection techniques.

At Block 66, the value tracking server 30 generates an ID 23, for example, a unique ID for association with the item 21. More particularly, the value tracking server 30 may generate and communicate the ID 23 to the corresponding POS location 40 for printing, at the POS location, of a label 24 bearing the ID. The ID 23 may be in the form of a barcode that identifies the quantity of or the weight of the item 21, the date of packaging or blending, and the relative material quantities. The ID 23 may include other and/or additional information, for example, the name and address of the POS location 40. The label 24, which may be an adhesive label, may be affixed or attached to the item 21 such as on the exterior of its packaging.

In some embodiments, the value tracking server 30 may optionally process tax payments (Block 68). More particularly, the value tracking server 30 may determine or obtain, the amount of tax due for each item 21. The value tracking server 30 may thus process the tax payment collected from the user at the POS location 40 for payment to the tax collecting entity. In other words, the value tracking server 30 may act as an intermediary between the POS location 40 and the tax collecting entity.

At Block 70, for example, after usage of at least a portion of the item 21, and at a time of return, the value tracking server 30 reads the ID 23 from the item to determine the relative material quantities in the item. For example, based upon the ID 23, the blended item 21 may be determined to be 40% (e.g., by weight) material "A" and 60% material "B". More particularly, the item 21 may be returned to a return location 42, which may be a different location than the POS location 40. Of course, the return location 42 may be the same location as the POS location 40. The ID 23 may be read at the return location 42, for example, from an optical barcode reader coupled to a point-of-return (POR) terminal 44. The POR terminal 44 may communicate the ID 23 to the value tracking server 30.

The value tracking server 30, at Block 72, determines a returned portion of the item 21. The returned portion of the item 21 may be less than all of the amount of the item purchased. Of course, the returned portion of the item 21 may be all of the amount of the item purchased. The returned portion of the item 21 may be determined based upon a measured weight of the item at the return location 42, for example, via a scale coupled to the POR terminal 44 and communicated to the value tracking server 30.

At Block 74, the value tracking server 30 determines a tax refund due based upon the relative material quantities, the respective tax rates, and the returned portion of the item. More particularly, the value tracking server 30 determines the returned portion of the item 21 based upon the returned weight (and/or in other embodiments, the returned volume) of the item. With respect to the example, above, if a user returns half of the blended cannabis item 21 that included 40% material "A", 60% material "B", the value tracking server 30 may determine the tax refund due based upon the respective tax rates of material "A" and material "B" charged to the user and the amount (e.g., weight) of the item returned.

In some embodiments, the value tracking server 30 may optionally process the tax refund (Block 76). More particularly, the value tracking server 30 may process the tax refund due to the user or the POS location 40 from the tax collecting entity. In other words, the value tracking server 30 may act an intermediary to obtain the tax refund between the POS location 40 and the tax collecting entity.

The return location 42 may facilitate destruction of the returned portion of the item 21. For example, in some jurisdictions, the return location 42, upon a return, must destroy the returned portion of the item 21 and certify the destruction to obtain the tax refund. Operations end at Block 78.

As will be appreciated by those skilled in the art, the system 20 may be particularly advantageous for calculating a tax refund due, for example, in the case of cannabis, to the dispensary or POS location 40. A POS location 40 may simply forego any attempt to determine and obtain a tax refund, for example, based upon the difficulty in doing so. However, the value of the tax refund may be relatively high for a given POS location 40, particularly if the taxing authority is asking for destruction of the returned item 21 portion in exchange for the tax refund. Indeed, the value tracking server 30 may process tax refunds (and payments) for multiple POS locations 40 such as to act as a tax payment intermediary, thus removing the accounting burden from the POS location, for example.

A method aspect is directed to a method of tax tracking of blended goods. The method includes using a value tracking server 30 to, at a time of sale of an item 21 including a plurality of materials blended together, collect relative material quantities in the item, wherein each of the materials has different respective tax rates associated therewith, and generate an identification (ID) 23 for association with the item. The method also includes, at a time of return, using the value tracking server 30 to read the ID 23 from the item 21 to determine the relative material quantities in the item, determine a returned portion of the item, and determine a tax refund due based upon the relative material quantities, the respective tax rates, and the returned portion of the item.

A computer readable medium aspect is directed to a non-transitory computer readable medium for tax tracking of blended goods. The non-transitory computer readable medium includes computer executable instructions that when executed by a processor 31 cause the processor to perform operations. The operations include, at a time of sale of an item 21 including a plurality of materials blended together, collecting relative material quantities in the item, wherein each of the materials having different respective tax rates associated therewith, and generating an identification (ID) 23 for association with the item. The operations also include, at a time of return, reading the ID 23 from the item 21 to determine the relative material quantities in the item, determining a returned portion of the item, and determining a tax refund due based upon the relative material quantities, the respective tax rates, and the returned portion of the item.

Many modifications and other embodiments of the invention will come to the mind of one skilled in the art having the benefit of the teachings presented in the foregoing That which is claimed is:

1. A system for tax tracking of blended goods comprising:
a plurality of point-of-sale (POS) locations for blending a plurality of materials together in an item, each POS location comprising a POS terminal for processing a sale of the item, a POS scale coupled to the POS terminal and configured to measure a sale weight of the item at a time of sale of the item, and a POS printer coupled to the POS terminal for printing a label bearing an identification (ID) for attachment to the item;
a plurality of point-of-return (POR) locations each comprising a POR scale configured to measure a return weight, and an optical reader; and
a value tracking server remote from the plurality of POS locations and POR locations, and configured to
at the time of sale of the item,
cooperate with a POS terminal at a given POS location to collect relative material quantities in the item, each of the materials having different respective tax rates associated therewith, and
generate the ID for association with the item for printing on the label at a corresponding POS printer, the ID having the relative material quantities in the item and sale weight associated therewith, and
at a time of return,
cooperate with the optical reader at a given POR location to read the ID from the item to determine the relative material quantities in the item and the sale weight,
cooperate with a corresponding POR scale to obtain the return weight and determine a returned portion of the item based upon a difference between the return weight and the sale weight, and
determine a tax refund due based upon the relative material quantities, the respective tax rates, and the returned portion of the item and communicate the tax refund due to the POS terminal at the given POS location so that an associated tax accounting burden is removed from the given POS terminal.

2. The system of claim 1 wherein the return location is configured to facilitate destruction of the returned portion of the item.

3. The system of claim 1 wherein said value tracking server is configured to process tax payments.

4. The system of claim 1 wherein said value tracking server is configured to process the tax refund.

5. The system of claim 1 wherein the plurality of materials comprises a plurality of types of cannabis.

6. The system of claim 5 comprising a cannabis dispensary, and wherein the plurality of types of cannabis are blended at the cannabis dispensary.

7. The system of claim 1 wherein the relative material quantities in the item comprise at least one of relative weights and relative volumes.

8. A method of tax tracking of blended goods comprising:
using a value tracking server remote from a plurality of point-of-sale (POS) locations and a plurality of point-of-return (POR) locations, the plurality of POS locations for blending a plurality of materials together in an item, each POS location comprising a POS terminal for processing a sale of the item, a POS scale coupled to the POS terminal and configured to measure a sale weight of the item at a time of sale of the item, and a POS printer coupled to the POS terminal for printing a label bearing an identification (ID) for attachment to the item, the plurality of POR locations each comprising a POR scale configured to measure a return weight, and an optical reader, the value tracking server being used to
at the time of sale of the item,
cooperate with a POS terminal at a given POS location to collect relative material quantities in the item, each of the materials having different respective tax rates associated therewith, and
generate the ID for association with the item for printing on the label at a corresponding POS printer, the ID having the relative material quantities in the item and sale weight associated therewith, and
at a time of return,
cooperate with the optical reader at a given POR location to read the ID from the item to determine the relative material quantities in the item and the sale weight,
cooperate with a corresponding POR scale to obtain the return weight and determine a returned portion of the item based upon a difference between the return weight and the sale weight, and
determine a tax refund due based upon the relative material quantities, the respective tax rates, and the returned portion of the item and communicate the tax refund due to the POS terminal at the given POS location so that an associated tax accounting burden is removed from the given POS terminal.

9. The method of claim 8 wherein using the value tracking server comprises using the value tracking server to process tax payments.

10. The method of claim 8 wherein using the value tracking server comprises using the value tracking server to process the tax refund.

11. The method of claim 8 wherein the relative material quantities in the item comprise at least one of relative weights and relative volumes.

12. A non-transitory computer readable medium for tracking of blended goods, the non-transitory computer readable medium comprising computer executable instructions that when executed by a processor, remote from a plurality of point-of-sale (POS) locations and a plurality of point-of-return (POR) locations, cause the processor to perform operations comprising:
at a time of sale of an item comprising a plurality of materials blended together,
cooperating with a POS terminal at a given POS location to collect relative material quantities in the item, each of the materials having different respective tax rates associated therewith, and
generating an identification (ID) for association with the item for printing on a label for attachment to the item at a corresponding POS printer at the given POS location, the ID having the relative material quantities in the item and a sale weight associated therewith, the sale weight measured by a POS scale at the given POS location; and
at a time of return,
cooperating with an optical reader at a given POR location to read the ID from the item to determine the relative material quantities in the item and the sale weight, cooperating with a corresponding POR scale at the POR location and determining a returned portion of the item based upon a difference between the return weight and the sale weight, and determining a tax refund due based upon the relative material quantities, the respective tax rates, and the returned portion of the item and communicating the tax refund due to the POS terminal at the given POS location so that an associated tax accounting burden is removed from the given POS terminal.

13. The non-transitory computer readable medium of claim 12 wherein the operations comprise processing tax payments.

14. The non-transitory computer readable medium of claim 12 wherein the operations comprise processing the tax refund.

15. The non-transitory computer readable medium of claim 12 wherein the relative material quantities in the item comprise at least one of relative weights and relative volumes.

\* \* \* \* \*